(12) United States Patent
Green et al.

(10) Patent No.: US 8,135,382 B1
(45) Date of Patent: Mar. 13, 2012

(54) BILLING AND OAM FUNCTION INTEGRATION IN A MIXED-SWITCHING ENVIRONMENT

(75) Inventors: Douglas R. Green, Lenexa, KS (US); Bejoy Pankajakshan, Olathe, KS (US); Randy Hiser, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 951 days.

(21) Appl. No.: 12/132,599

(22) Filed: Jun. 3, 2008

(51) Int. Cl.
*H04M 11/00* (2006.01)
*H04W 4/00* (2009.01)

(52) U.S. Cl. ........................ 455/406; 455/466

(58) Field of Classification Search .......... 455/405–408, 455/466
See application file for complete search history.

(56) References Cited

U.S. PATENT DOCUMENTS

| | | | | |
|---|---|---|---|---|
| 2003/0006912 A1* | 1/2003 | Brescia | .................... | 340/990 |
| 2003/0216147 A1* | 11/2003 | Morin et al. | .................... | 455/466 |
| 2006/0095501 A1* | 5/2006 | Mochida | .................... | 709/203 |
| 2006/0199597 A1* | 9/2006 | Wright | .................... | 455/466 |
| 2007/0135146 A1* | 6/2007 | Rezaiifar et al. | .................... | 455/466 |

* cited by examiner

*Primary Examiner* — Lester Kincaid
*Assistant Examiner* — Daniel Lai

(57) ABSTRACT

Methods, systems, and media are provided for interfacing components in a wireless telecommunications network. An interface allows for the efficient transfer of data that facilitates billing and operations functions. This data is transferred from proxy gateways to application servers to servers that provide billing functions and operations, administration, and management (OAM) functions. The interface enables the transmission by communicating a mobile switching center code, a proxy identifier, a traffic restriction flag, and a packet data unit type. By aggregating this information at the application server into a useful form for devices used in billing and operations, information technology (IT) overhead for billing and operations systems support is reduced. Also lowered is the congestion present on the network, as fewer links are necessary between servers and proxies. The proxy gateway is situated between a circuit-switched network providing access services and a packet-switched network providing connectivity services. The gateway also is coupled to an application server on the packet-switched network.

17 Claims, 4 Drawing Sheets

BILLING AND OAM FUNCTION INTEGRATION IN A MIXED-SWITCHING ENVIRONMENT

SUMMARY

The present invention is defined by the claims below. A high-level overview of embodiments of the invention are provided herein for that reason, to provide an overview of the disclosure.

In a first aspect, a system is described for interfacing components in a wireless telecommunications network for the purpose of transferring data enabling business and operations management functions. The system comprises a proxy gateway logically coupled to an application server. The proxy gateway is situated between a circuit-switched network providing access services and a packet-switched network providing connectivity services. The application server is part of the packet-switched network. An interface enables the transmission of data that facilitates business and operations management functions between the proxy gateway and the application server by communicating a mobile switching center code, a proxy identifier, a traffic restriction flag, and a packet data unit type.

In a second aspect, a method is described aggregating data that facilitates billing and operations functions associated with maintenance of a wireless telecommunications network. At a proxy gateway, a short message is received from a first user on a circuit-switched network. User information and information registering the message to an application server are also received at the gateway from a packet-switched network providing connectivity services. Through an interface, data that facilitates billing and operations functions associated with the network is communicated between the proxy gateway and an application server. Without receiving additional data from a server configured to perform billing functions, the message is communicated from the proxy gateway to a second user on the circuit-switched network. The data that facilitates billing and operations functions is aggregated at the application server and communicated to a server that is configured to provide billing functions and/or to a server configured to provide operations, administration and management (OAM) server.

In a third aspect, a set of computer-useable instructions are provided for performing a method of efficiently transferring data that facilitates billing and operations functions associated with a telecommunications network. This transfer enables messaging across circuit-switched and packet-switched sub-networks. Via a circuit-switched sub-network providing access services, a message from a first user is received at a proxy gateway. Via a packet-switched sub-network providing connectivity services, user information and application-server-registration information is received at the proxy gateway. Through a novel interface using additional packet header fields, data that facilitates billing and operations functions is communicated from the proxy gateway to the application server. The facilitating data is aggregated at the application server prior to communicating the aggregated data. The aggregated data is then communicated to at least one of a server configured to perform billing functions and a server configured to perform OAM functions. The message is communicated from the proxy gateway to a second user on the circuit-switched network without creating a billing link between the server configured for billing and the proxy gateway.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
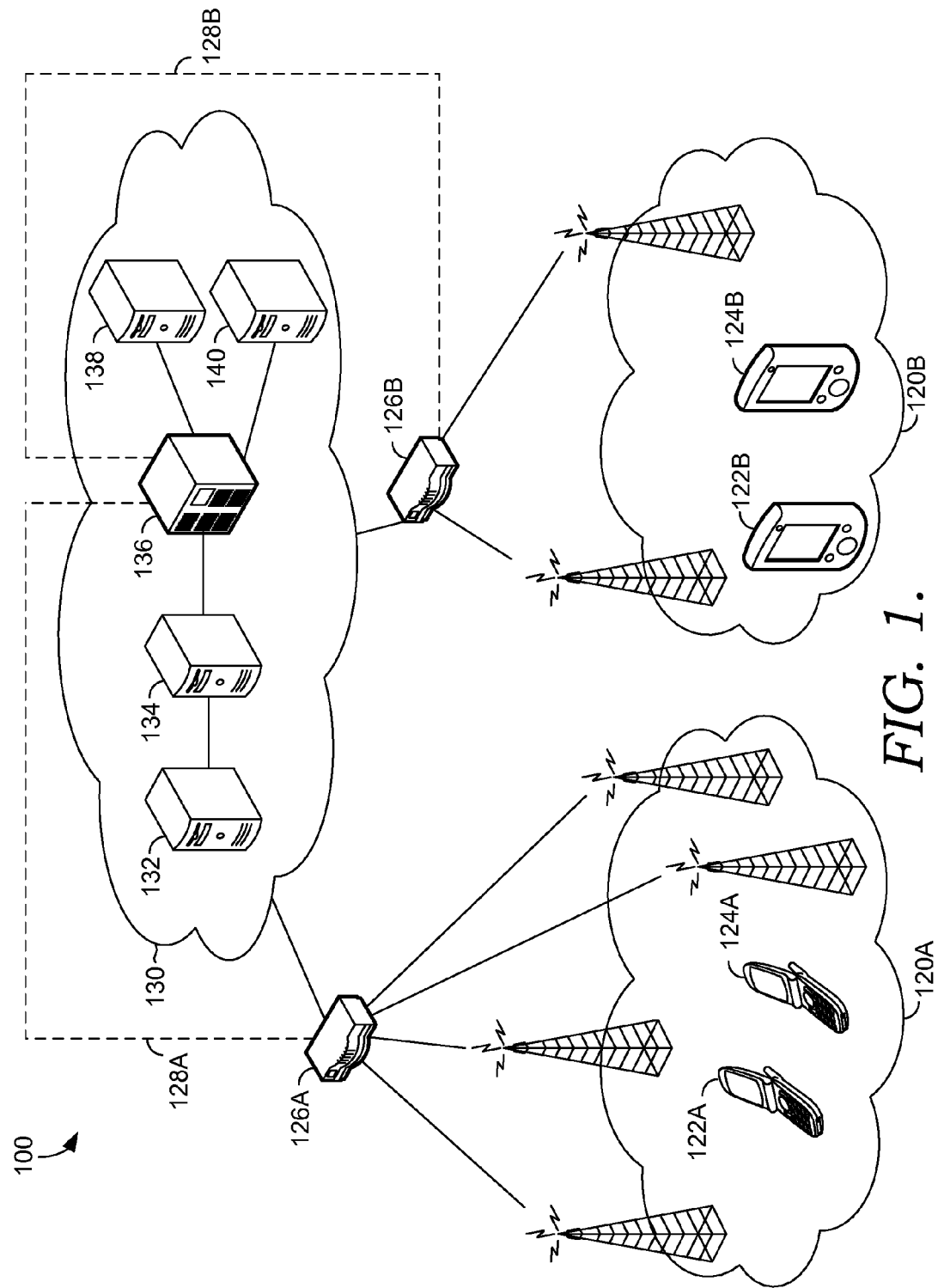
FIG. 1 depicts an exemplary network environment in which an interface can be utilized to efficiently transfer data that facilitates billing and operations functions in accordance with an embodiment of the present invention.

Embodiments of the present invention provide systems, media and methods for communicating information at proxy gateways in order to reduce the number of interfaces needed for short messaging architectures. Rather than require separate interfaces for each system, packet header fields are added to packets at the proxy gateway. This information can, in turn, be sent to an application server. The added header information removes the need to send the entire packet for routing through a short message service center (SMSC), helping to further reduce network overhead. Reduction in interfaces ease the programming burden for business and operations support systems to be implemented.

Throughout the description of the present invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| API | Application Programmatic Interface |
| AS | Application Server |
| ASN | Access Service Network |
| BSS | Business Support Systems |
| CS | Circuit-Switched |
| CSCF | Call Service Control Function |
| EMI | External Machine Interface |
| HSS | Home Subscription Server |
| IP | Internet Protocol |
| MMS | Multimedia Server |
| MSC | Mobile Switching Center |
| OAM | Operations, Administration and Management |
| OSS | Operations Support Systems |
| PDA | Personal Data Assistant |
| PDU | Packet Data Unit |
| PS | Packet-Swtiched |
| RAN | Radio Access Network |
| SIP | Session Initiated Procol |
| SMPP | Short Message Peer-to-Peer |
| SMS | Short Message Service |
| SMSC | Short Message Service Center |
| SS-7 | Signaling System 7 |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring now to FIG. 1, an exemplary telecommunications environment 100 is depicted that can be used in embodiments of the present invention. This environment is greatly simplified for clarity, while an actual environment would likely contain hundreds or thousands of devices. Some of those additional devices would provide similar features as the components depicted and described below, while others would provide entirely different functions. Also, some devices are described as a particular type or variety of server. These devices may be specialized devices, but may also be multi-purpose servers that are configured to perform the described function. Thus, environment 100 should not be construed to limit the claimed invention to the devices shown or in the exemplary configuration, but is one illustration of an environment in which the invention may be practiced. As depicted, environment 100 is divided into two primary types of networks. The first are networks that provide access services, which will also be referred to as access services networks (ASN) and are shown in duplicate by ASN 120A and ASN 120B. The second are networks that provide connectivity services, i.e., connecting access networks. An instance of this type network will be referred to as a connectivity services network (CSN) 130. While these networks are shown as clearly defined units, their distinction is not so easily recognized in a real-world implementation. There are components that offer functionality for both aspects of the network and due to this overlap cannot be readily classified as belonging exclusively to one or the other. However, for the sake of this disclosure, each network will be shown and described as a separate collection of devices.

In describing certain embodiments of the present invention, ASN 120A and ASN 120B will be understood to depict circuit-switched radio access networks. These could be any number of networks currently found in use, such as a cellular telephone network using one of the prevalent code division multiple access (CDMA) protocol technologies. Likewise ASN 120A or 120B could use a frequency division multiple access (FDMA) or a time division multiple access (TDMA) protocol. The type of protocol used by ASN 120A and ASN 120B is only relevant in that a radio-access environment is provided. Connectivity services network 130 will be understood to be a core network of a packet-switched variety and once again does not require a specific protocol or architecture. Examples of protocols that could be employed by CSN 130 are session initiated protocol (SIP) or Internet Protocol (IP). However, these examples once again are not intended to limit the types of network standards that are used by CSN 130, but are merely provided as illustrative packet-switched networking protocols.

Shown on ASN 120A are two mobile devices 122A and 124A. Mobile devices 122B and 124B are depicted on ASN 120B. Devices 122A and 124A are depicted as cellular telephones and devices 122B and 124B are shown as hybrid cellular telephone and personal data assistant (PDA) devices. The use of like devices on an ASN is not necessary, nor does a particular type of device need be used. Rather, the exemplary devices are selected because of their ubiquitous nature among current mobile devices. Thus, a cellular telephone and hybrid device may be used to message one another with the present invention.

Non-numbered transceiver towers are shown, but again should not be perceived as limiting the nature of the present invention to only those networks with towers. For example, an access network could use a "picocell" or "femtocell" transceiver to enable indoor coverage. These alternative transceivers transmit for a short range to a very limited number of devices, such as in a home. The shape, size and signal capabilities of the transceiver are not important as long as radio access is provided. Also a part of ASN 120A and ASN 120B are mobile switching centers (MSCs), not shown or numbered, that direct connections on the network. MSCs connect one user to another, handle the movement by a user from one transceiver to another while maintaining the end-to-end connection, and release connections once a call or message is complete. Additionally, an MSC is the primary point from which traffic at a transceiver enters the greater telecommunications network.

Continuing with respect to FIG. 1, proxy gateway 126A is depicted as coupling ASN 120A and CSN 130. A substantially similar proxy gateway 126B is shown coupling ASN 120B and core network 130. Both gateways serve as a translation point between the circuit-switched ASN and packet-switched CSN 130. Thus, the gateway receives a message from the mobile switching center in a protocol such as the Signaling System 7 (SS-7) protocol, and converts it into a form the core network can interpret, such as SIP. In this respect, the gateway can be seen as sitting at a point between the two networks and providing a metaphorical doorway for a call or message to travel from one to the other. Because of overlap of networks, the gateway alternatively can be understood to be the outermost edge of CSN 130, receiving calls and messages in protocols that are unable to be processed as sent, and translating it for the remainder of CSN 130 to manipulate.

The first server shown within the exemplary environment of CSN 130 is Call Session Control Function (CSCF) server 132. As implemented in reality, there is not a single control server 132, but a multitude of servers that together handle control functions for the network. There are additional sub-varieties of CSCF servers on a telecommunications network that make up this group. Interrogating CSCF servers (I-CSCF) are one such device, responsible for coupling CSN 130 with domain name servers (DNS) on the outside of CSN 130. Another related device is a serving CSCF (S-CSCF), which is able to route signals to a number of components by inspecting all packets along its path. The numbers and types of CSCF servers are not limiting with regard to the present invention. The single CSCF server 132 is shown for the sake of clarity and because collectively CSCF servers communicate with a home subscriber server (HSS) 134. This communication is necessary in order to authenticate users, access needed user information, and enforce provider policies, among other tasks that HSS 134 helps perform. Again, the number and interconnection of devices with HSS 134 is merely illustrative and should not be construed as allowing only one HSS 134.

Depicted on the right side of connectivity services network 130 are short message application server 136, billing server 138, and operations, administration, and management (OAM) server 140. Application server 136 can be any server providing higher-level applications to the telecommunications network. For instance, a server providing SMPP short messaging applications can be an exemplary application server 136. For the purposes of this disclosure, short messaging will be understood to be one of the many varieties of text or multi-media messaging currently available. The particular protocol is not limiting on the embodiments of the present invention. It requires only that the application and protocol are capable of use by mobile device users on a circuit-switched access network, even with the application server's inclusion in the packet-switched CSN 130. However, this short message application server could implement one of a number of protocols, such as short messaging service (SMS) protocol, short message peer-to-peer protocol (SMPP), external machine interface (EMI) protocol, or multimedia service protocol (MMS).

As shown, billing server 138 and OAM server reside in the packet-switched environment of CSN 130 as well. They are logically coupled to application server 136. However, there is no requirement that the components be directly linked or physically connected as components may be situated between AS 136 and the administrative devices. The present invention does not require a parallel configuration as shown, nor is serial connection required. Rather, AS 136 must simply be capable of communicating necessary information and data with billing server 138 and OAM server 140. Billing server 138 will be instrumental in maintaining records, providing or updating applicable service levels, and determining proper billing for customers. OAM server 140 is involved with the typical activities associated with network monitoring, such as determining losses and delays of network traffic. Other functions OAM server 140 may be tasked with include fault detection and management, alarm suppression, and implementation of traces. The two taken together allow a telecommunications provider to implement and maintain Business Support Systems (BSS) and Operations Support Systems (OSS) for its customers.

Finally with respect to FIG. 1, a dotted line connects proxy gateways 126A and 128B with application server 136. This represents interface 128A and interface 128B, which are indicative of the present invention's ability to provide efficient communications between proxy gateways and an application server. Previous systems required a mobile switching center to contact a short message service center (SMSC). After forwarding portions of a message from an SMSC to a billing server, which required another interface, a billing link would be established between the billing server and proxy gateway in order to complete the message-sending process. Without the additional interface and the billing link, which cause further congestion on the network, the messaging process would not be possible. A drawback of that system is the requirement of a separate SMSC for the circuit-switched MSC, when a proxy gateway could leverage the resources of the packet-switched core network. More specifically, a gateway provides the means of translation, in turn allowing an application server to handle both types of access networks. Even with the use of a proxy gateway, without the present invention a billing link would be required for messaging to take place. Again, this creates congestion on the network. The interface between proxy gateway 126A and application server 136 eliminates the need for the additional SMSC-to-billing interface and the billing link to the gateway. The particular data used as a part of this interface will be discussed in further detail below with reference to FIGS. 3 and 4. However, it should be noted that the users accessing the network with circuit-switched ASN 120A are users who typically would take advantage of CSN 130 through a packet-switched access network. Thus, either by roaming on a circuit-switched network or by using a dual-use device (i.e. capable of circuit-switched and packet-switched access), someone who normally would utilize packet-switched technology can still gain access through a circuit-switched network.

Figure 2:
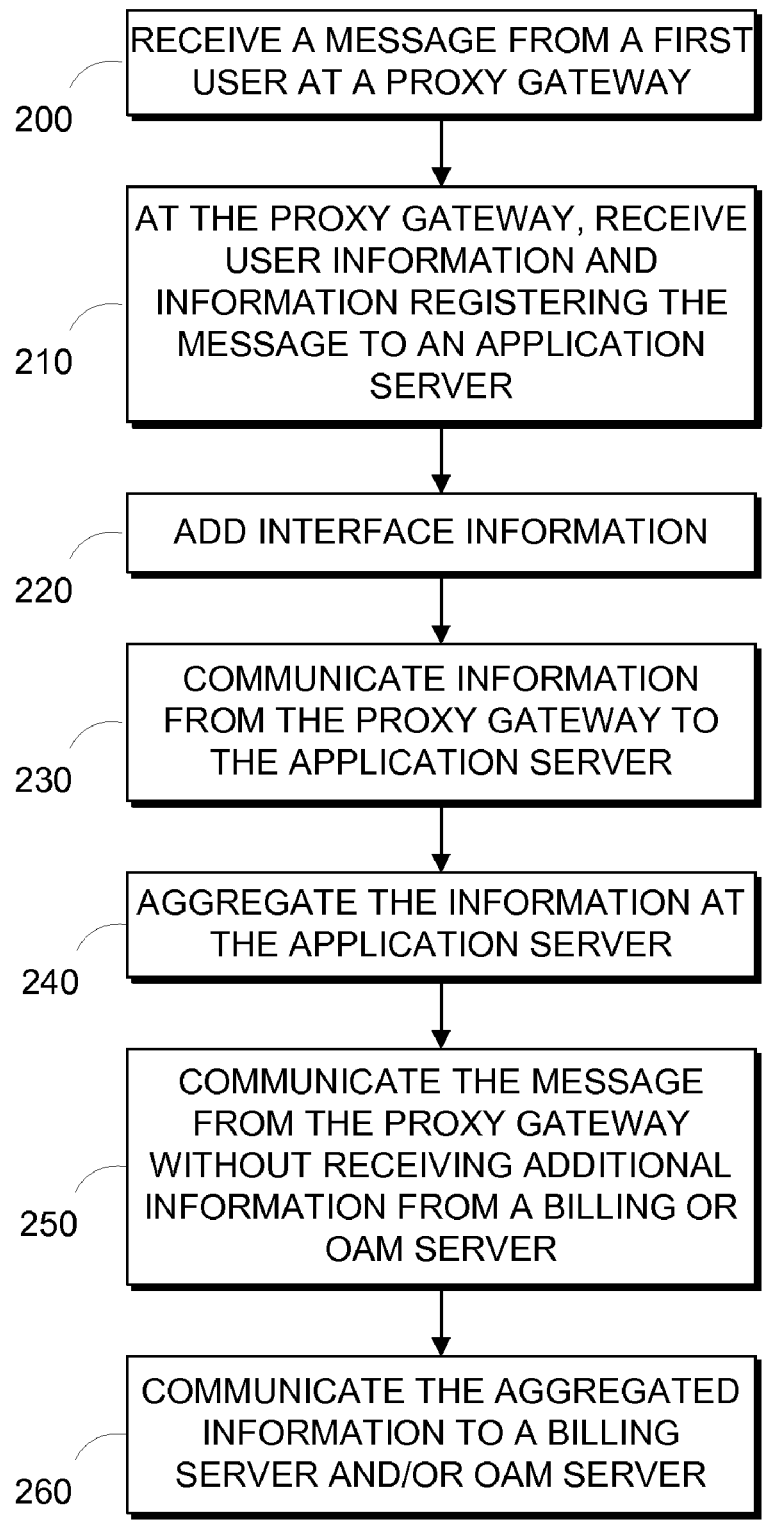
FIG. 2 is a flowchart depicting a method for aggregating data that facilitates billing and operations functions in accordance with an embodiment of the present invention.

An exemplary method that can be practiced in environment 100 utilizing claimed embodiments of the present invention is depicted in FIG. 2. As such, the method will be described with reference to devices and components shown in FIG. 1. This exemplary explanation will be understood to involve a message sent from one user to another on ASN 120A. One of the novel aspects of the present invention is the ability for two users on the same access services network, both of whom are not on their home network, to message one another with as few network resources involved as possible. This could be two users with data-only access plans, e.g., users operating with microwave access plans. An exemplary access plan may use Worldwide Interoperability for Microwave Access (WiMAX) technology as set forth by the WiMAX Forum® administered at Beaverton, Ore. Users under such a plan, without access on their own packet-based network, would rely on circuit-switched legacy networks or networks of other providers. The efficient use of resources on these non-home networks includes a reduction of network congestion with respect to the message traffic itself, as well as a reduction in the information technology (IT) resources needed to implement such a method.

At a step 200, a message is received from first user 122A at proxy gateway 126A. This may be a message following any of the above-mentioned protocols, such as SMS, SMPP, EMI, or MMS. The message is received from a mobile switching center on an access services network that employs circuit-switching protocols. The message can be received with a protocol such as SS-7, or any other circuit-switched method. At a step 210, proxy gateway 126A receives user information and application-server-registration information. Reception of this information can be from a connectivity services network source such as from HSS 134. Sent with a packet-switched method, for example SIP or IP, the information can be communicated in the form of a user profile. This will allow for authentication information, as well as services available to the user, to be ascertained. At a step 220, interface information is added to the information received from home subscriber server 134. This interface information can include a mobile switching center point code, a proxy identifier, a traffic restriction code, and a packet data unit (PDU) type, all of which will be expounded upon in describing FIGS. 3 and 4. This information can be included as packet header information in the packet-switched environment of CSN 130.

At a step 230, the previously received information as well as that added as interface information is communicated from proxy gateway 126A to an application server. This can be an AS such as application server 136, and is sent using interface 128A. Because both proxy gateway 126A and application server 136 are on the packet-switched connectivity services network 130, this information can be transferred as packet header information. At application server 136, a step 240 is performed wherein the information is aggregated into a form allowing for the useful transfer of that data to billing server 138 and OAM server 140. Again, because this information is in packet-switched environment, even though the message itself will be sent and communicated on a circuit-switched access network, only the relevant information need be proxied to the appropriate network devices by the gateway. At step 240, this involves the aggregation of information that billing server 138 will require for implementation of BSS functions, and the data that OAM server 140 will require for OSS tasks. In neither instance must the packet with the payload, i.e. the short message itself, be sent from gateway 126A to application server 136, or from AS 136 to either "back-end" server (server 138 or 140). Instead, only the signaling information is sent.

At a step 250, the short message sent by the user is communicated from proxy gateway 126A to second user 124A, without receiving additional information from a billing or OAM server. Because the interface has allowed the proxy server to take the place of SMSC functions and transfer the necessary data, a billing link is not required. Thus, the message payload need not be sent to the SMSC to forward on to billing server 138, in order to set up a billing link between server 138 and proxy gateway 126A. Instead, the IT expenditure required is reduced through this use of data, and the complication of interfacing all required component devices is lowered as well. At a step 260, the aggregated information is communicated to the appropriate device—billing server 138 or OAM server 140—as it is needed to complete back-end processing. This allows application server 136 to communicate the pertinent data needed to billing server 138, OAM server 140, or both. Once the information is sent to the back-end devices, normal BSS/OSS tasks can occur.

Figure 3:
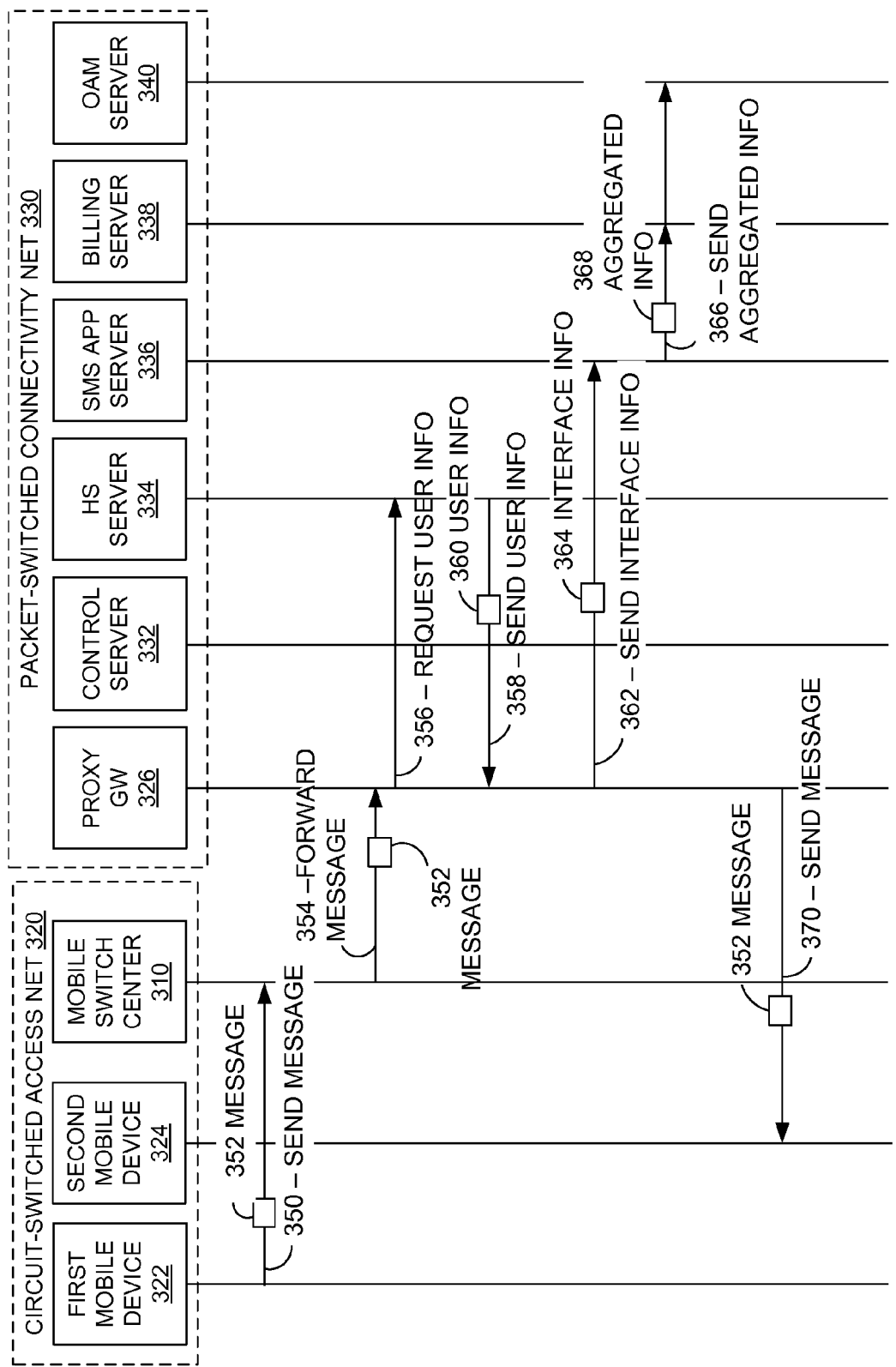
FIG. 3 depicts an exemplary message and data flow utilized in accordance with an embodiment of the present invention.

With reference now to FIG. 3, an exemplary message and information transfer flow diagram is depicted, along with the pertinent information communicated at each step. The ASNs shown in FIG. 1 are simplified. ASN 320 includes a mobile switching center 310, a first mobile device 322, and a second mobile device 324. ASN 320 is denoted with a dotted line and is understood to be a circuit-switched, radio access network, although the dotted line is used to impart the lack of definitive boundary between the ASN and its CSN. Also shown with a dotted line is connectivity services network 330, substantially similar to previously described CSN 130. As seen above, packet-switched CSN 330 includes a proxy gateway 326, a CSCF server 332, a home subscriber server 334, a short messaging application server 336, a billing server 338, and an OAM server 340. As was to be understood when described above, CSN 330 will in actuality include a number of these elements in various configurations. The diagram depicted includes only one example of each type of server for clarity sake. The presence or absence of other types of servers on CSN 330 or ASN 320 are not intended to limit the quantities or varieties of servers, switches, routers, gateways, or other elements present on either network.

At a step 350, a short message 352 is sent from first mobile device 322 to MSC 310. This is a message using one of a number of formats, including but not limited to SMS, SMPP, EMI, or MMS. As long as the message may be sent on a radio-access network, with overarching circuit-switched access technologies, any protocol is suitable. One example would be CDMA, but this is not required. Mobile switching center 310 may take one of any known architectures suitable for providing access in a circuit-switched radio access network. The same message 352 is then forwarded to proxy gateway 326 at a step 354. Once received by gateway 326, a step 356 occurs whereby information about the user and message are requested. This request is sent to HSS 334 by way of control server 332, in order to retrieve user information and administrative data. Examples of data that may be retrieved are the application server which will be used in the process of sending the message, as well as the billing level the user is entitled to enjoy. One example of how this information may be stored is seen in the context of a user profile. A user profile may include all required information for BSS, OSS, and message completion. The needed set of data, herein referred to collectively and shown as user information 360, is retrieved from HSS 334. User information 360 then is sent to proxy gateway 326 at a step 358.

Once user information 360 is received at proxy gateway 326, the gateway then performs two steps which provide novel aspects of the present invention. At a step 362, information, such as that needed by billing server 338 and/or required by OAM server 340, is sent from gateway 326 to application server 336. This information will be referred to and is shown as interface information 364. Information 364 is the data passed through interface 128A and 128B as shown in FIG. 1. This can be packet header information related to the MSC used, the gateway location, the packet type, and any restrictions that are placed on the packet. At application server 336, this information can be aggregated into the forms most convenient for BSS and OSS operation, the most efficient for processing at the back-end servers, or the means otherwise most advantageous for the telecommunications provider.

At a step 370, message 352 is sent from proxy GW 326 to second mobile device 324 by way of MSC 310. The transmission at step 370 occurs without the need for establishing a billing link between billing server 338 and proxy gateway 326. Additionally, the interface data sent from gateway 326 to AS 336 (later to be aggregated and sent to back-end servers) does not require sending the packet payload. Both features allow for the reduction of overall congestion on the network. Interface information 364 can also be aggregated as necessary at application server 336. This can reduce the application programmatic interfaces (APIs) needed by operations and business support systems, which in turn reduces the information technology (IT) resources needed to develop and support them.

Figure 4:
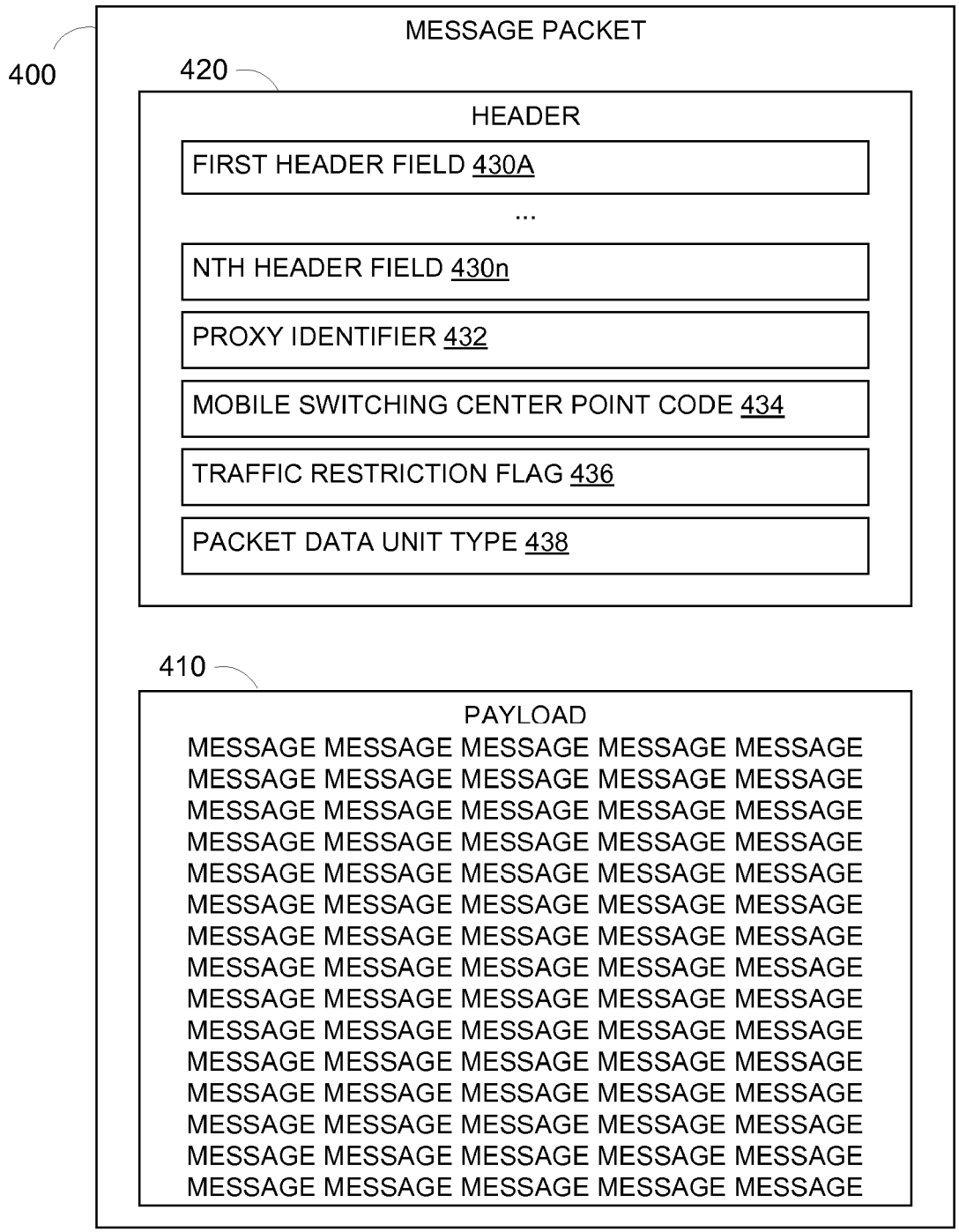
FIG. 4 is a simplified diagram depicting a message packet with header fields added according to an embodiment of the present invention.

Turning now to FIG. 4, a simplified representation depicting a message packet 400 is shown. Reference will be given to corresponding elements and steps in FIG. 3, however elements shown in FIG. 1 may be equally applicable. The method with which packet 400 is sent is not necessary for the understanding of the described embodiments of the present invention, other than to require one of a number of known circuit-switched access protocols that are available. Thus, SMS, SMPP, EMI, or MMS message may be used to create packet 400.

Contained within packet 400 is a payload portion 410 and a header portion 420. Payload portion 410 is simply the message the first user has sent from first mobile device 322. In the event that a longer message is sent through multiple short messages in a concatenated fashion, some information to reconstruct the long message may be placed inside the payload portion. For ease of description and clarity sake, packet 400 will be understood to be a self-standing, complete short message. In a concatenated instance, payload 410 would contain only enough header information needed for message reconstruction and would primarily contain message text as is seen in the non-concatenated example.

Header portion 420 is further subdivided by the header fields that are included. In exemplary header portion 420, standard header fields are generically denoted as fields 430A-430n. Header field 430A is listed as a first header field while 430n is described as the nth header field. This representation shows that any number of standard header fields can be used in implementing some embodiments of the present invention. The standard fields used should not limit the implementation of embodiments of the present invention and the fields depicted are not intended to limit the claimed invention to two fields or any other specified number of fields. Rather it is intended to convey that several additional header fields can be added to standard packet header fields.

Header fields 432-438 are depicted as additional information according to certain embodiments of the present invention. These are header fields added at proxy gateway 326 in order to ease the congestion of data flow on CSN 330, reduce the number of APIs needed by BSS and OSS architectures, and leverage the packet-based CSN 330 even when circuit-switched ASN 320 is used. The addition of these headers also reduces the IT resources necessary for interface implementation as proxy gateway 326 communicates with the application server 336. Rather than need a separate interface for the MSC to communicate with the billing server by way of an SMSC, MSC-to-gateway communications are all that are required when viewed from the access services network.

Proxy identifier 432 is header information allowing application server 336 to ascertain through which proxy gateway message 352 is being sent. The type of identifier or scheme in which the gateways are denoted does not alter the novelty of the embodiments of the present invention. Rather, any manner in which each gateway can be given a unique identifier on CSN 330 is contemplated within the scope of the present invention. MSC point code 434 provides SMAS 336 the data pertinent to the mobile switching center responsible for sending the message to the gateway, as seen with MSC 320 in FIG. 3. Again, this does not require the use of a particular nomenclature, but merely that unique identification of the MSCs be utilized.

Traffic restriction flag 436 can be used for the demarcation of particular actions that must be taken with respect to the message's routing. This could control the type of devices to which the packet may be sent, such as a limitation based on the media capabilities of the receiving device. Other limitations could be based on information in the user's profile, such as the user's billing level. The restrictions that can be noted and implemented through the use of this header field, are limited only by the policies and capabilities of the telecommunications provider. Packet data unit (PDU) type 438 allows the packet to be marked according to the messaging protocol in which packet in encoded. For example, if the packet is an SMPP packet, PDU type 438 can directly reflect that. This would be marked accordingly if PDU type 438 were indicating an SMS packet, EMI packet, or MMS packet, whatever the case may be in actually implementing short messaging on the network.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for aggregating data that facilitates billing and operations functions associated with maintenance of a wireless telecommunications network, the method comprising:
   receiving at a proxy gateway via a circuit-switched sub-network providing access services, a message from a first user;
   receiving at the proxy gateway via a packet-switched sub-network providing connectivity services, user information and application-server-registration information;
   through an interface, communicating data from the proxy gateway to an application server, wherein the data facilitates billing and operations functions associated with the network, and the data does not include the message;
   aggregating the data at the application server;
   communicating, via the packet-switched sub-network, the data from the application server to at least one of a server configured to perform billing functions and a server configured to perform operations, administration and management (OAM) functions; and
   without receiving additional data from a server configured to perform billing functions, communicating, via the circuit-switched sub-network, the message from the proxy gateway to a second user.

2. The method of claim 1, wherein the first user and second user communicate messages via a circuit-switched network providing access services to the telecommunications network.

3. The method of claim 2, wherein the proxy gateway and application server are logically coupled via a packet-switched network providing connectivity services within the telecommunications network.

4. The method of claim 3, wherein the message is a short message compatible with at least one of short message service protocol, short message peer-to-peer protocol, external machine interface protocol, and multimedia message service protocol.

5. The method of claim 4, wherein the user information and application-server-registration information received at the proxy gateway are communicated from a server configured to perform home-subscriber functions.

6. The method of claim 5, wherein the data includes a mobile switching center code and at least one of a proxy identifier, a traffic restriction flag, and a packet data unit type.

7. The method of claim 6, wherein the first user and second user are communicating via a network other than the respective networks that regularly provide the users' home access services.

8. The method of claim 7, wherein the first user and second user's respective networks for home-access services are data-only networks.

9. The method of claim 8, wherein the data-only networks are microwave access networks.

10. One or more non-transitory computer-storage media having computer-executable instructions embodied thereon for performing a method of efficiently transferring data that facilitates billing and operations functions associated with a telecommunications network, wherein the transfer enables communication of messages across a telecommunication network containing circuit-switched sub-network and packet-switched sub-network, and wherein the messages on packet-switched sub-network include both header portions and payload portions, the method comprising:

via a circuit-switched sub-network providing access services, receiving at a proxy gateway a message from a first user;

via a packet-switched sub-network providing connectivity services, receiving at the proxy gateway user information and application-server-registration information;

communicating data that facilitates billing and operations functions from the proxy gateway to the application server;

aggregating the data at the application server;

communicating the aggregated data to at least one of a server configured to perform billing functions and a server configured to perform operations, administration and management (OAM) functions; and communicating the message from the proxy gateway to a second user on the circuit-switched sub-network.

11. The media of claim 10, wherein the message is a short message compatible with at least one of short message service protocol, short message peer-to-peer protocol, external machine interface protocol, and multimedia message service protocol.

12. The media of claim 10, wherein the data that facilitates billing and operations functions is communicated as packet header information.

13. The media of 12, wherein the packet header information includes a mobile switching center code and at least one of a proxy identifier, a traffic restriction flag, and a packet data unit type.

14. The media of claim 10, wherein the data that facilitates billing and operations functions is communicated without conveying the message payload portion.

15. A system for interfacing components in a wireless telecommunications network for the purpose of transferring data enabling business and operations management functions, the system comprising:

a proxy gateway logically coupled to an application server, wherein the proxy gateway is situated between a circuit-switched network providing access services and a packet-switched network providing connectivity services;

the application server, wherein the application server is part of the packet-switched network; and an interface that enables the transmission of data that facilitates business and operations management functions between the proxy gateway and the application server, wherein the interface receives additional information from a server configured to provide home-subscriber functions in order to enable communication of data facilitating business and operations management from the proxy gateway to the application server, and wherein the interface receives from the proxy gateway and communicates to the application server a mobile switching center code and at least one of a proxy identifier, a traffic restriction flag, and a packet data unit type.

16. The system of claim 15, wherein the proxy gateway is capable of communicating packets in at least one of short message service protocol, short message peer-to-peer protocol, external machine interface protocol, and multimedia message service protocol.

17. The system of claim 15, wherein the application server is an application server configured to provide short messaging capable of communicating packets in at least one of short message service protocol, short message peer-to-peer protocol, external machine interface protocol, and multimedia message service protocol.

* * * * *